United States Patent [19]
Hanke

[11] 3,941,224
[45] Mar. 2, 1976

[54] CONTINUOUS HYDRODYNAMIC BRAKE FOR MOTOR VEHICLES, ESPECIALLY HEAVY COMMERCIAL VEHICLES

[75] Inventor: Hans Hanke, Stuttgart, Germany

[73] Assignee: Daimler-Benz Aktiengesellschaft, Germany

[22] Filed: Feb. 5, 1975

[21] Appl. No.: 547,166

[30] Foreign Application Priority Data
Feb. 7, 1974 Germany............................ 2405740

[52] U.S. Cl. ............... 192/13 A; 192/4 B; 192/12 A
[51] Int. Cl. ...................... B60k 41/24; B60k 41/26
[58] Field of Search.... 192/13 R, 13 A, 12 A, 12 C, 192/4 B, 7, 9

[56] References Cited
UNITED STATES PATENTS
2,277,584    3/1942    Freeman....................... 192/13 A X
3,498,426    3/1970    Nakano........................ 192/13 A
3,542,173    11/1970   Kratzenberg et al................ 192/4 B
3,777,860    12/1973   Forster et al. ................ 192/12 A X Primary Examiner—Samuel Scott
Assistant Examiner—Lance W. Chandler
Attorney, Agent, or Firm—Craig & Antonelli

[57] ABSTRACT

A continuous brake for motor vehicles, especially for heavy commercial vehicles, in the form of a hydrodynamic coupling, which is filled from a storage device during actuation of the brake valve and which is automatically emptied into the storage device when the brake valve is disengaged, a solenoid-actuated three-way valve is thereby arranged in the line from the brake valve to the storage device which, when energized, closes the line from the brake valve and vents the line to the storage device while a switch is connected in the energizing circuit of the solenoid valve which closes during actuation of the clutch pedal when the clutch is disengaged.

7 Claims, 1 Drawing Figure

U.S. Patent March 2, 1976 3,941,224
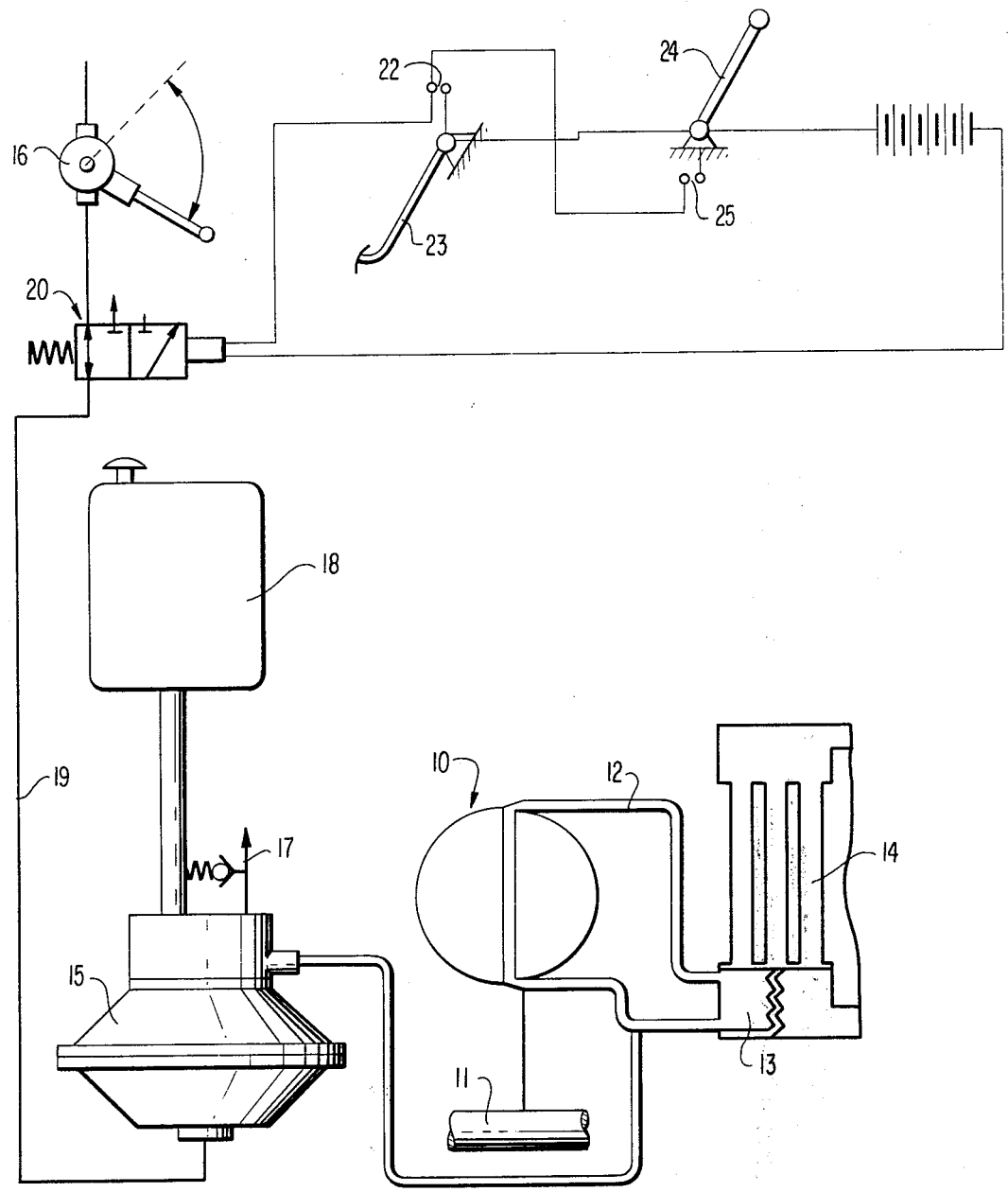

CONTINUOUS HYDRODYNAMIC BRAKE FOR MOTOR VEHICLES, ESPECIALLY HEAVY COMMERCIAL VEHICLES

The present invention relates to a continuous brake for motor vehicles, especially for heavy commercial types of vehicles such as trucks or buses, in the form of a hydrodynamic coupling preferably driven by the crankshaft of the driving engine, which during actuation of the brake valve is filled from a reservoir or storage tank and which empties itself automatically into the reservoir or storage tank when the brake valve is disengaged or released.

With known continuous brakes of the aforementioned type which are coordinated to the engine and under certain circumstances are arranged directly on the crankshaft, the engine rotational speed is reduced so strongly during a change in the speed of the changespeed transmission that—especially when shifting back into a lower speed—difficulties occur with the rotational speed adaptation when re-engaging the clutch. The strongly reduced engine rotational speed thereby becomes noticeable in strong shifting shocks. If the changes-speed transmissions are not synchronized, then in this case a speed change with double declutching, i.e., with giving gas while the gear shift lever is in neutral and the clutch is temporarily reengaged for purposes of re-accelerating the engine and transmission input shaft, would practically be no longer possible. The described difficulties can be eliminated in that with an engaged continuous brake, this continuous brake is at first disengaged prior to the speed change and after the re-engagement of the clutch, is again re-engaged. However, the driver is burdened very heavily by such a manipulation and additionally the vehicle remains thereby in a condition without continuous brake during an excessively long period of time.

The present invention is concerned with the task to avoid the described difficulties. Consequently, an installation is to be provided, by means of which a change in speed can be attained with an engaged continuous brake without burdening the driver and without an excessively long disengagement of the continuous brake. As solution to the underlying problem, the present invention offers the general concept to automatically disengage the continuous brake engaged by way of the brake valve prior to the change in speed—i.e., without any influence or intervention on the part of the driver—and to re-engage the same again directly after the termination of the shifting operation.

In particular, it is proposed by the present invention that a solenoid-actuated three-way valve is arranged in the line from the brake valve to the reservoir or storage device which, when energized, blocks the line from the brake valve and vents the line to the reservoir or storage device and that a switch is connected in the energizing circuit of the solenoid valve which closes when actuating the clutch pedal or disengaging the clutch.

The present invention offers the advantage that the retarder which possibly may have been engaged previously, is now completely automatically disengaged again prior to each speed change in the change-speed transmission. This takes place without any participation on the part of the driver so that the driver can direct his entire attention to the road traffic. This automation also offers the advantage that the pause occurring in the retarder operation can be kept as small as possible. It should also be mentioned at this occasion that it is immaterial in principle whether the transmission of the shifting pulse takes place pneumatically, hydraulically, mechanically or electrically. The electrical solution described herein is not to be construed limitative of and does not preclude in any way any other transmission or transmissions as known in the art.

According to a further development of the inventive concept, a second switch is provided at the speed-shifting lever of the vehicle change-speed transmission or at a corresponding part and is connected in parallel to the first switch whereby the second switch closes when the shifting lever is in the neutral position. This construction will be used preferably with claw transmissions, i.e., with those transmissions without synchronization. A shifting with double-declutching is then possible in this manner. The retarder means is disengaged also when giving gas during double declutching and it is again finally engaged only, when the clutch is closed during reengagement. It should also be mentioned at this point that the pulse switch at the clutch pedal is preferably so arranged by conventional means that it is actuated prior to the disengagement and after the engagement of the clutch. It is avoided in this manner that with an unclean, improper operation, i.e., with the dragging of the clutch, the pulse switch for the retarder is not reached at all. Finally, it should also be mentioned that it is appropriate if according to a further proposal of the present invention the valve is constructed as a rapidly shifting valve of conventional type. Any unnecessary time delay is avoided in this manner and—as already mentioned—the time interval or duration for the disengagement of the retarder is kept as small as possible.

Acccordingly, it is an object of the present invention to provide a continuous brake for motor vehicles which avoids by simple means the aforementioned shortcomings and drawbacks encountered in the prior art.

Another object of the present invention resides in a continuous brake for motor vehicles in which the shifting of the transmission speeds poses no problem, especially poses no difficulties as regards the rotational speed matching during the re-engagement of the clutch.

A further object of the present invention resides in a continuous brake for motor vehicles, especially for heavy-duty commercial vehicles equipped with non-synchronized change-speed transmissions, in which shifting shocks can be avoided notwithstanding the use of a continuous brake.

Still a further object of the present invention resides in a continuous brake for motor vehicles in which the driver is not burdened with unnecessary duties during the shifting of the speeds of the change-speed transmission notwithstanding the presence of a continuous brake.

Another object of the present invention resides in a continuous brake in which an excessively long disengagement thereof is avoided during changing the speeds of the transmission.

A further object of the present invention resides in a continuous brake of the type described above which is fully automatic, reliable in operation and simple in construction and arrangement.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of a retarder arrangement inclusive a retarder circuit in accordance with the present invention.

Referring now to the single FIGURE of the drawing, the retarder generally designated by reference numeral 10 is arranged on the crankshaft 11 of the driving engine (not shown) of the vehicle. A cooler 13 which may be structurally combined with the radiator 14 of the driving engine is arranged in the external circulation 12 of the retarder 10. The circulation 12 of the retarder 10 is filled from a reservoir or storage device 15 which is operable to be actuated with compressed air by means of the brake valve 16. Control and shifting devices of conventional construction are additionally provided in the circulation 12 and at the reservoir or storage device 15 which are not illustrated herein for purposes of simplification since they are known in the art and form no part of the present invention. The conventional lubrication (not shown) of the retarder 10 is also operatively connected with the schematically indicated connecting means 17 of the reservoir or storage device 15. A reserve tank 18 assures for the compensation of any leakage losses in the storage device 15 or in the other parts of the installation.

A three-way valve generally designated by reference numeral 20 which can be actuated magnetically is interconnected in the compressed air line 19 between the storage device 15 and the brake valve 16. In the de-energized condition, this solenoid valve 20 is in the illustrated position, i.e., the line 19 is opened up to provide a communication between the brake valve 16 and the storage device 15. Upon energization of the solenoid valve 20, in contrast thereto, the connection from the brake valve 16 to the storage device 15 is closed and the latter, in contrast thereto, is connected with the atmosphere, i.e., is vented. In the latter condition or in the latter shifting position, the circulation 12 of the retarder 10 can then empty itself back into the storage device 15 in a known manner.

A switch 22 is connected in the energizing circuit 21 of the solenoid valve 20 which is so coordinated to the clutch pedal 23 that the switch 22 is closed when disengaging the clutch and is opened again correspondingly upon re-engagement of the clutch. The closing and opening of the switch 22 takes place—as already mentioned—shortly prior to the opening of the clutch and shortly after the closing of the clutch, respectively. Consequently, out of the illustrated position, this switch 22 is closed during actuation of the clutch pedal 23, i.e., the solenoid valve 20 is shifted into its other position. The storage device 15 is therefore vented and the retarder 10 immediately centrifuges itself again empty. The speed change can then be realized without retarder influence. During the re-engagement of the clutch, the switch 22 is again opened, i.e., the solenoid valve 20 is again de-energized and the storage device 15 is again acted upon by the brake valve 16. The retarder 10 is therefore again filled immediately after the re-engagement of the clutch.

In case that the change-speed transmission involves a claw transmission, i.e., a transmission without synchronization, a further switch 25 is coordinated to the shifting lever 24 which is connected in parallel to the switch 22. The switch 25 is so operable that it is closed in the idling or neutral position of the shifting lever 24. In this manner a giving of gas during double declutching is possible because in the neutral position of the shifting lever 24, the switch 25 is closed and therewith the solenoid valve 20 remains energized in its venting position (not shown), even if the clutch pedal 23 is released again for a short period of time for giving gas during the double-declutching operation. Only when the next speed is then engaged, the solenoid valve 20 will again be de-energized during the final re-engagement of the clutch and consequently the retarder 10 is again filled.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A continuous brake for motor vehicles comprising a hydrodynamic coupling means, a brake valve means, means for filling the hydrodynamic coupling means from a storage means upon actuation of the brake valve means and for automatically emptying the hydrodynamic coupling means upon disengagement of the brake valve means, characterized in that a solenoid-actuated three-way valve means is arranged in a line from the brake valve means to the storage means, said solenoid-actuated three-way valve means being operable, when energized, to close the line section from the brake valve means and to vent the line section leading to the storage means, and switch means operatively connected in the energizing circuit of said solenoid valve means, said switch means being operable to close upon disengagement of a clutch.

2. A continuous brake according to claim 1, with a clutch pedal for actuating the clutch, characterized in that said switch means is operable to close upon actuation of said clutch pedal to disengage said clutch.

3. A continuous brake according to claim 1, with a change-speed transmission, characterized in that a further switch means is provided at a part of the shifting mechanism, said further switch means being connected in parallel with the first-mentioned switch means and being operable to close when the transmission is in the neutral position.

4. A continuous brake according to claim 3, characterized in that said part of the vehicle change-speed transmission is a shifting lever.

5. A continuous brake according to claim 4, characterized in that the three-way valve means is constructed as rapidly closing valve.

6. A continuous brake according to claim 5, with a clutch pedal for actuating the clutch, characterized in that said switch means is operable to close upon actuation of said clutch pedal to disengage said clutch.

7. A continuous brake according to claim 1, characterized in that the three-way valve means is constructed as rapidly closing valve.

* * * * *